(12) United States Patent
Okabe et al.

(10) Patent No.: US 9,726,473 B2
(45) Date of Patent: Aug. 8, 2017

(54) LIGHT INTERFERENCE MEASURING DEVICE AND PROGRAM THEREFOR

(71) Applicant: Mitutoyo Corporation, Kawasaki, Kanagawa (JP)

(72) Inventors: Kenji Okabe, Kanagawa (JP); Gyokubu Cho, Kanagawa (JP); Tatsuya Nagahama, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 14/570,376

(22) Filed: Dec. 15, 2014

(65) Prior Publication Data

US 2015/0176967 A1  Jun. 25, 2015

(30) Foreign Application Priority Data

Dec. 20, 2013  (JP) ................................ 2013-263628

(51) Int. Cl.
*G01B 11/02* (2006.01)
*G01B 9/02* (2006.01)
*G01B 11/24* (2006.01)

(52) U.S. Cl.
CPC ....... *G01B 9/02077* (2013.01); *G01B 9/0209* (2013.01); *G01B 11/2441* (2013.01)

(58) Field of Classification Search
CPC .............. G01B 11/2441; G01B 9/0203; G01B 9/02077; G01B 9/0209; G01B 9/02055;
(Continued)

(56) References Cited

U.S. PATENT DOCUMENTS 4,277,174 A * 7/1981 Kleesattel .............. G01B 11/00
356/626
4,707,129 A * 11/1987 Hashimoto .......... G01B 9/0207
356/152.2
(Continued)

FOREIGN PATENT DOCUMENTS

JP  2011-191118  9/2011

*Primary Examiner* — Michael A Lyons
*Assistant Examiner* — Rufus Phillips
(74) *Attorney, Agent, or Firm* — Rankin, Hill & Clark LLP (57) ABSTRACT

A light interference measuring device comprises: a light source 20 that outputs light; a beam splitter 222 that causes the light output from the light source to diverge into a reference optical path and a measurement optical path and that outputs a combined wave in which reflection light that has passed through the reference optical path and reflection light that has passed through a measuring object arranged in the measurement optical path are combined; a reference mirror 231 that is arranged in the reference optical path and that reflects light which is diverged into the reference optical path by the beam splitter 222; a stage 12 that is arranged in the measurement optical path and that has the work W placed thereon; an imaging part 25 that images an image in which the combined wave is formed; a reference mirror adjustment mechanism (234, 238, 239) that adjusts a posture of the reference mirror 231; and a control part that controls the reference mirror adjustment mechanism such that a reflecting surface of the reference mirror 231 corresponds to a measurement surface of the work W, based on an image imaged in a condition where a work W is placed on the stage.

12 Claims, 7 Drawing Sheets

(58) Field of Classification Search
CPC ............ G01B 9/02062; G01B 9/02067; G01B 9/02068; G02B 7/1821; G02B 7/182; G02B 7/1822; G02B 7/18; G02B 5/08; G02B 5/0808; G02B 26/0858; G02B 26/06

See application file for complete search history.

(56) References Cited

U.S. PATENT DOCUMENTS

| | | | | |
|---|---|---|---|---|
| 5,173,796 | A * | 12/1992 | Palm | G01B 11/02 250/234 |
| 5,321,501 | A * | 6/1994 | Swanson | A61B 1/00096 250/227.27 |
| 6,252,667 | B1 * | 6/2001 | Hill et al. | 356/487 |
| 6,657,728 | B1 | 12/2003 | Okabe | |
| 6,999,180 | B1 * | 2/2006 | Janik et al. | 356/503 |
| 7,593,596 | B2 * | 9/2009 | Takahashi et al. | 382/276 |
| 8,891,090 | B2 | 11/2014 | Nagahama et al. | |
| 8,896,842 | B2 * | 11/2014 | Bower et al. | 356/497 |
| 9,062,958 | B2 * | 6/2015 | Hidaka et al. | |
| 2004/0165642 | A1 * | 8/2004 | Lamont | G02B 26/10 372/107 |

* cited by examiner

LIGHT INTERFERENCE MEASURING DEVICE AND PROGRAM THEREFOR

CROSS-REFERENCE TO RELATED APPLICATION

This non-provisional application claims priority under 35 U.S.C. §119(a) from Japanese Patent Application No. 2013-263628, filed on Dec. 20, 2013, the entire contents of which are incorporated herein by reference.

BACKGROUND OF THE INVENTION

Field of the Invention

The present invention relates to a light interference measuring device that performs measurement, which makes use of brightness information of the interference fringes generated by the interference of light, and a program for adjusting the light interference measuring device.

Description of the Related Art

Conventionally, light interference measuring devices, such as three-dimensional shape measuring devices that measure, for example, the three-dimensional shape of a measuring object in a precise manner by making use of brightness information of the interference fringes generated by the interference of light, are known.

For example, in a light interference measuring device that makes use of a white-light light source, at a focused position where the optical path lengths of a reference optical path and a measurement optical path match each other, the peaks of the interference fringes of the respective wavelengths are superimposed onto each other and the brightness of the combined interference fringes increases. Accordingly, in the light interference measuring device, by capturing, with an imaging element such as a CCD camera or the like, an interference image that indicates a two-dimensional distribution of the interference light intensities while varying the optical path length of the reference optical path or the measurement optical path, and, by detecting a focused position at which the interference light intensities reach their peaks at the respective measurement positions within a capturing field of view, it is possible to measure a height of a measurement surface in a corresponding measurement position and thus a three-dimensional shape or the like of the measuring object (see, for example, Patent Document 1).

PRIOR ART REFERENCES

Patent Documents

Patent Document 1: JP2011-191118A

SUMMARY OF THE INVENTION

In the above-described light interference measuring device, an angle adjustment of a stage or a work piece (sample) is performed, at the time of measuring a sample, so as to generate the interference fringes in an interferometer mounted onto the device body. When the angle adjustment of the work piece or stage is performed, a cosine error occurs at the time of measuring the work piece with an imaging element mounted onto the interferometer or an observation device (for example, an image optical head or the like) which is co-installed onto the light interference measuring device, and thus, it is difficult to achieve a precise shape measurement. In addition, it is not easy to adjust a heavy stage in a rapid and precise manner.

Accordingly, it is an object of the present invention to provide a light interference measuring device that solves the above problem and in which it is possible to perform adjustment for generating the interference fringes without affecting the coordinate system of the light interference measuring device.

In order to achieve the above object, a light interference measuring device according to the present invention comprises: a light source that outputs light; a beam splitter that causes the light output from the light source to diverge into a reference optical path and a measurement optical path and that outputs a combined wave in which reflection light that has passed through the reference optical path and reflection light that has passed through a measuring object arranged in the measurement optical path are combined; a reference mirror that is arranged in the reference optical path and that reflects light which is diverged into the reference optical path by the beam splitter; a stage that is arranged in the measurement optical path and that has the measuring object placed thereon; an imaging part that images an image in which the combined wave is formed; a reference mirror adjustment mechanism that adjusts a posture of the reference mirror; and a control part that controls the reference mirror adjustment mechanism such that a reflecting surface of the reference mirror corresponds to a measurement surface of the measuring object, based on an image imaged by the imaging part in a condition where a measuring object for adjustment is placed on the stage. Based on such configuration, the adjustment for generating interference fringes can be made, by solely changing the posture of the reference mirror, without changing the angle of the measuring object or the stage onto which the measuring object is placed (thus, without affecting the coordinate system of the light interference measuring device).

In the present invention, the control part may control the reference mirror adjustment mechanism such that the number of interference fringes present in an image imaged by the imaging part in a condition where the measuring object is placed on the stage is a predetermined number or less. For example, the reference mirror adjustment mechanism may include: a front-rear adjustment mechanism that drives, in a microscopic manner, the reference mirror in an optical axis direction; and an angle adjustment mechanism that adjusts an angle of the reference mirror, and wherein the control part may control the front-rear adjustment mechanism so as to control a position in the optical axis direction of the reference mirror such that the interference fringes are present in the image imaged by the imaging part, and the control part may control the angle adjustment mechanism so as to adjust the angle of the reference mirror such that the number of the interference fringes present in the image imaged by the imaging part is a predetermined number or less. Based on such configuration, the adjustment of the reference mirror can be performed in a precise and rapid manner.

In the present invention, the light source, the beam splitter, the reference mirror, the imaging part and the reference mirror adjustment mechanism configure an interference optical system which is detachable from the body of the light interference measuring device. Prior to the adjustment of the posture of the reference mirror performed by the control part controlling the reference mirror adjustment mechanism, the interference optical system may adjust an angle relative to the measuring object, based on focused positions at a plurality of positions in an image of the measuring object imaged by the imaging part in a condition where the interference fringes are not generated. Based on such configuration, the coordinate system of the interference optical system can be made to match the coordinate system of the light interference measuring device. Consequently, rapid switching can be performed between the measurement by means of the interference optical system and the measurement by means of other measuring means provided to the light interference measuring device.

In the present invention, the light source may be configured to be capable of selectively outputting white light and monochromatic light in a switching manner. Based on such configuration, both the white-light interference measurement which has a wider measurement range and the monochromatic light interference measurement which is capable of ultraprecise measurement can be performed by selecting either in accordance with a purpose.

In addition, in order to achieve the above object, a program according to the present invention causes a computer to function as the control part in the light interference measuring device described above. Based on such configuration, the adjustment can be made for generating the interference fringes, by solely changing the posture of the reference mirror, without changing the angle of the measuring object or the stage onto which the measuring object is placed (thus, without affecting the coordinate system of the light interference measuring device).

DETAILED DESCRIPTION OF THE EMBODIMENTS

[Image Measuring Device Configuration]

Hereinafter, a measuring device in which an interference optical system and an image measuring device are combined, wherein such measuring device is an embodiment of an light interference measuring device according to the present invention, will be described with reference to the drawings.

Figure 1:
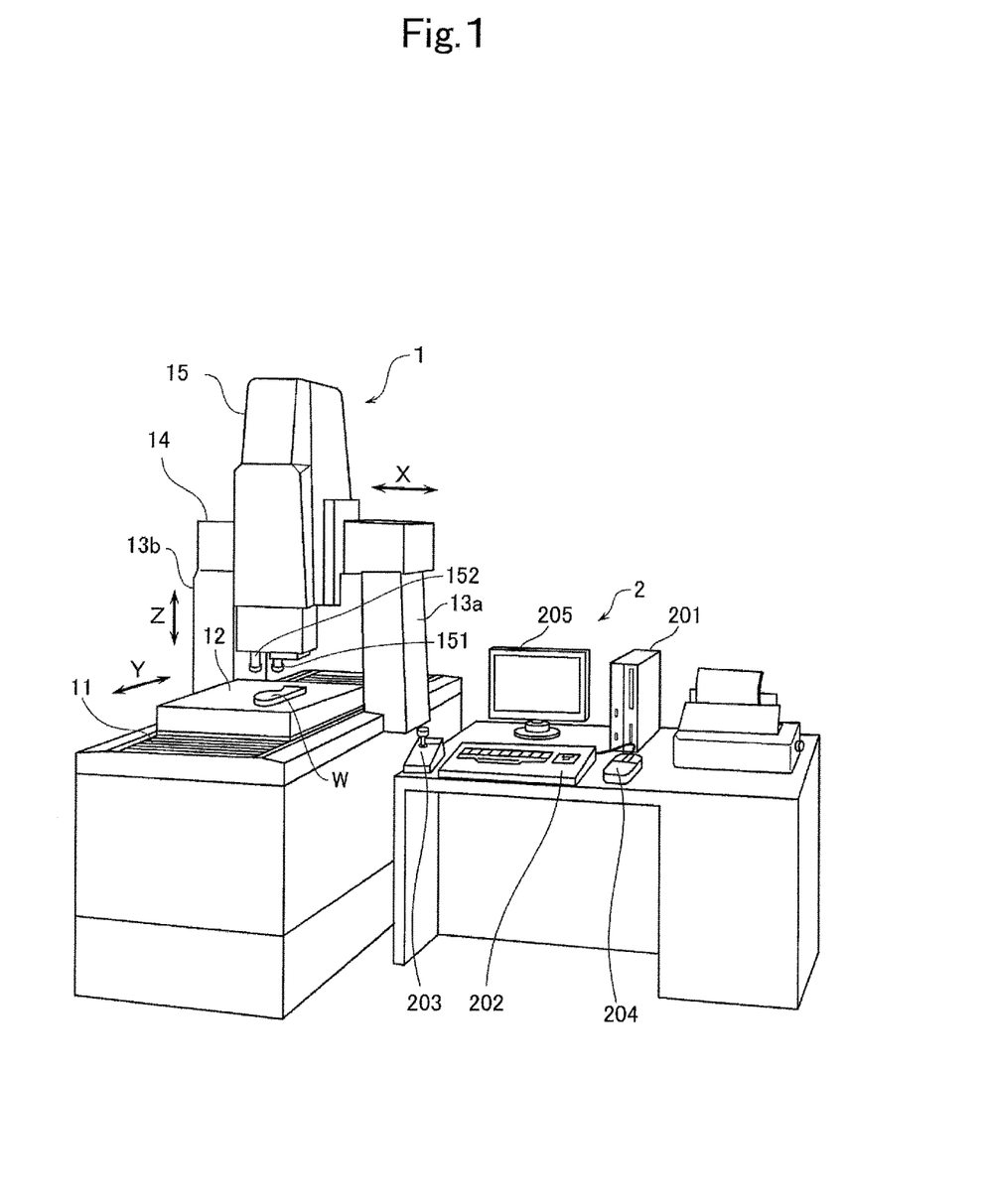
FIG. 1 is a perspective view showing the overall configuration of a measuring device in which an interference optical system and an image measuring device are combined, wherein such measuring device is an embodiment of a light interference measuring device.

FIG. 1 is a perspective view showing the overall configuration of the measuring device, in which the interference optical system and the image measuring device are combined, according to the present invention. The measuring device in which the interference optical system and the image measuring device are combined is provided with a non-contact image measuring instrument and a computer system 2 that drive-controls the image measuring instrument and carries out required data processing. It should be noted that the measuring device in which the interference optical system and the image measuring device are combined may also be provided, in addition to the above, with a printer for printing out measurement results or the like as needed.

The measuring device 1 in which the interference optical system and the image measuring device are combined is provided with a mount 11, a sample table (stage) 12, support arms 13a and 13b, an X-axis guide 14 and an imaging unit 15. As shown in FIG. 1, the measuring device 1 is arranged on a vibration isolation table 3 which is placed on the floor. The vibration isolation table 3 prevents the vibration of the floor from being propagated to the measuring device 1 on the table. The vibration isolation table 3 may be an active type or a passive type. The mount 11 is arranged on the table top of the vibration isolation table 3. Then, on the mount 11, the stage 12 having a work piece W placed thereon is placed such that a top surface thereof coincides, as a base surface, with a horizontal surface. The stage 12 is driven in a Y-axis direction by means of a Y-axis drive mechanism, which is not shown. The Y-axis drive mechanism enables the work piece W to move in the Y-axis direction with respect to the imaging unit. The upwardly extending support arms 13a and 13b are fixed at central parts on both side edges of the mount 11. Then, the X-axis guide 14 is fixed so that both top end parts of the support arms 13a and 13b are coupled to each other. The X-axis guide 14 supports the imaging unit 15. The imaging unit 15 is driven, along the X-axis guide 14, by means of an X-axis mechanism, which is not shown.

The imaging unit 15 is provided, in a removable manner, with an image optical head 151 that images a two-dimensional image of the work piece W and a light interference optical head 152 that measures a three-dimensional shape of the work piece W through light interference measurement. The imaging unit 15 measures the work piece, at a measurement position set by the computer system 2, using either head. The measurement field of view of the image optical head 151 is typically set so as to be larger than the measurement field of view of the light interference optical head 152. The imaging unit 15 is configured such that both heads can be used through switching in accordance with control by the computer system 2. The image optical head 151 and the light interference optical head 152 are supported by a common support plate so that a certain positional relationship is maintained therebetween and are pre-calibrated so that no coordinate axes change occurs between prior to and after the switching.

The image optical head 151 is provided with a CCD camera, an illumination device, a focusing mechanism and the like, and captures a two-dimensional image of the work piece W. The data of such captured two-dimensional image is then taken into the computer system 2.

Figure 2:
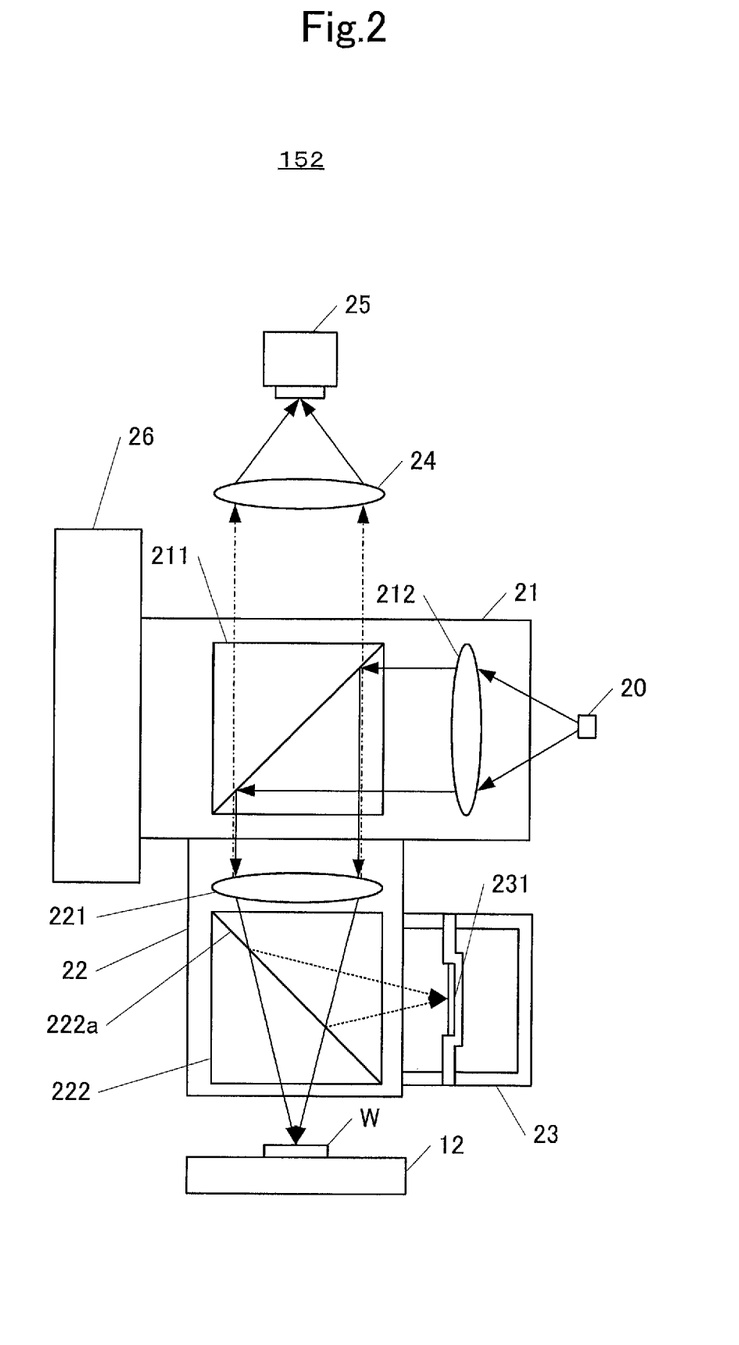
FIG. 2 is a schematic view showing the configuration of a light interference optical head 152, along with optical paths.

As shown in FIG. 2, the light interference optical head 152 is provided with a light output part 20, a light interference optical head part 21, an objective lens part 22, a reference mirror part 23, an image-forming lens 24, an imaging part 25 and a drive mechanism part 26.

The light output part 20 is provided with a light source that outputs low-coherence broadband light having a number of wavelength components over a broadband. As for the light source, for example, a white light source such as a halogen light source, a light emitting diode (LED) or the like is used.

The light interference optical head part 21 is provided with a beam splitter 211 and a collimator lens 212. The light output from the light output part 20 is delivered in a collimated manner to the beam splitter 211 via the collimator lens 212, from a direction perpendicular to an optical axis of the objective lens part 22. From the beam splitter 211, light is output along such optical axis and the collimated beam is delivered from above to the objective lens part 22.

The objective lens part 22 is provided with and configured by an objective lens 221, a beam splitter 222 or the like. At the objective lens part 22, when the collimated beam is input into the objective lens 221 from above, the input light becomes converging light at the objective lens 221, and the converging light is then input into a reflecting surface 222*a* inside the beam splitter 222. Here, the input light is diverged into reflection light (reference light) that travels through a reference optical path (denoted by a dashed line in the figure) having a reference mirror 231 and transmitted light (measurement light) that travels through a measurement optical path (denoted by a solid line in the figure) having a work piece W arranged therealong. The reflection light converges and is reflected at the reference mirror 231, and is further reflected by the reflecting surface 222*a* of the beam splitter 222. On the other hand, the transmitted light converges and is reflected at the work piece W, and transmits through the reflecting surface 222*a* of the beam splitter 222. The reflected light from the reference mirror 231 and the reflected light from the measuring object W become a combined wave by being combined by the reflecting surface 222*a* of the beam splitter 22.

The combined wave which is combined at the position of the reflecting surface 222*a* of the beam splitter 222 becomes a collimated beam at the objective lens 221, travels upwardly, and is then input into the image-forming lens 24 after passing through the light interference optical head part 21 (denoted by a dashed-dotted line in FIG. 2). The image-forming lens 24 converges the combined wave and forms an interference image onto the imaging part 25.

Figure 3:
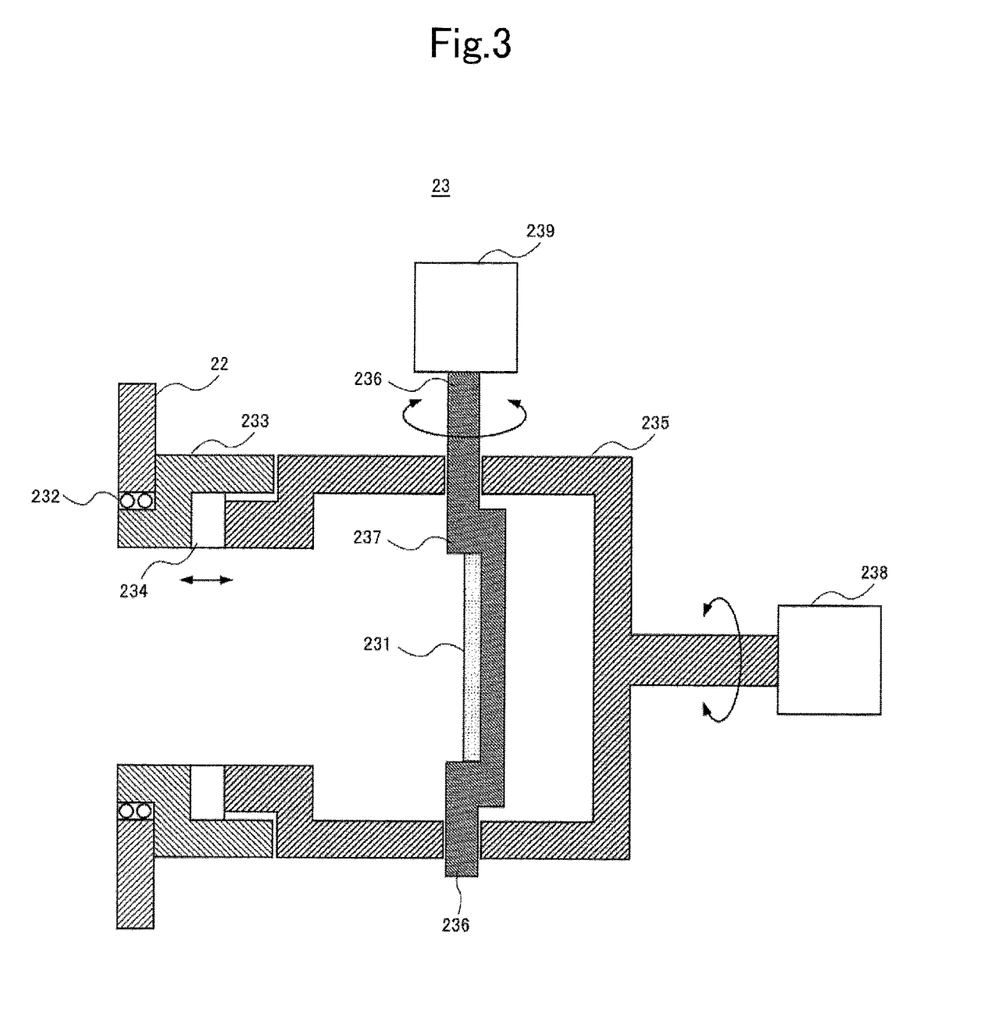
FIG. 3 is a cross-sectional view showing the structure of a reference mirror part 23.

As shown in FIG. 3, the reference mirror part 23 retains the reference mirror 231 that reflects the reflection light (reference light) that travels through the reference optical path, which is diverged by the above-described beam splitter 222. Further, a posture (for example, position and angle) of the reference mirror 231 is made adjustable so that the interference fringes are generated between the reflected light of the reference mirror 231 and the reflected light from a measurement surface of the work piece W. In particular, the reference mirror part 23 is provided with a first storage tube 233, a piezo actuator 234, a second storage tube 235 and a retention member 237. The first storage tube 233 is rotatably attached to the objective lens part 22 via a bearing 232. The piezo actuator 234 is arranged at an end face of the first storage tube 233 and is extendable in the axis-direction of the first storage tube 233. The second storage tube 235 is coupled to the first storage tube 233 via the piezo actuator 234 and has a reference mirror 231 inside thereof. The retention member 237 retains the reference mirror 231 inside the second storage tube 235. The retention member 237 has the reference mirror 231 on a surface facing the beam splitter 222. The reference mirror 231 is swingably retained, in the retention member 237, about a pair of swinging axes 236 which are projected to the positions where the reference mirror 231 is sandwiched therebetween. In addition, a motor 238 and a motor 239 are provided so as to adjust the angle of the reference mirror 231. The motor 238 rotates the entire reference mirror part 23 about the optical axis of the reference light so that the reference mirror 231 is at a desired angle, and keeps the same at such desired angle. Further, the motor 239 rotates the retention member 237 around the swinging axes 236 so that the reference mirror 231 is at a desired angle, and keeps the same at such desired angle. The piezo actuator 234 drives, in a microscopic manner, the second storage tube 235 having the reference mirror 231 inside thereof in the optical axis direction of the reference light. The piezo actuator 234, the motor 238 and the motor 239 are numerically-controlled by the computer system 2 (i.e. CNC), and function as a reference mirror adjustment mechanism that controls the posture of the reference mirror 231.

The imaging part 25 is a CCD camera, or the like, comprised of two-dimensional imaging elements. The imaging part 25 images an interference image of the combined wave (i.e. the reflected light from the work piece W and the reflected light from the reference mirror 231) output from the objective lens part 22. The data of such imaged image is then taken into the computer system 2.

Figure 4:
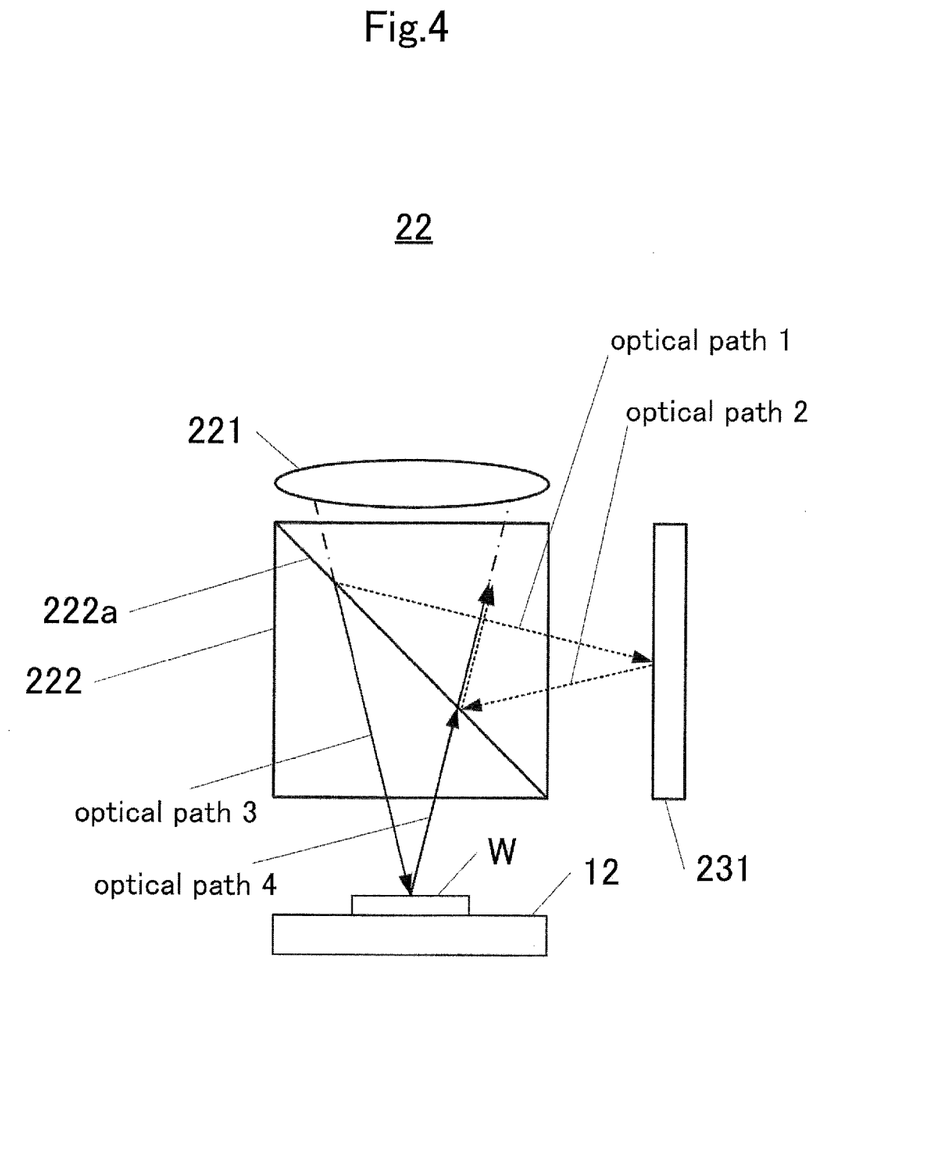
FIG. 4 is a relevant-part enlarged view showing the structure of an objective lens part 22, and a measurement optical path and a reference optical path.

The drive mechanism part 26 moves the light interference optical head 152 in the optical axis direction based on a move command from the computer system 2. Here, in the relevant-part enlarged view of the objective lens part 22 shown in FIG. 4, the optical path length difference is 0 when the optical path length of the reference optical path (optical path 1+optical path 2) and the optical path length of the measurement optical path (optical path 3+optical path 4) are equal. Accordingly, the drive mechanism part 26, when carrying out measurement, adjusts the length of the measurement optical path by moving the light interference optical head 152 in the optical axis direction (i.e. the Z-axis direction) such that the optical path length difference is 0. It should be noted that the case in which the light interference optical head 152 is moved is illustrated in the above; however, a configuration in which the length of the measurement optical path is adjusted by moving the stage 12 is also possible. Further, a configuration in which the length of the reference optical path (optical path 1+optical path 2) can be made variable by the movement of the reference mirror 231 in the optical axis direction by means of the piezo actuator 234, is also possible. As can be seen from the above, the optical path length of either the reference optical path or the measurement optical path can be made variable in the light interference optical head 152.

Under control of the computer system 2, the light interference optical head 152 repeats imaging by means of the imaging part 25, while its position in the optical axis direction being moved and scanned by means of the drive mechanism part 26. The image data of the interference images imaged by the imaging part 25 at the respective moved and scanned positions is taken into the computer system 2, and, for each position in the measurement field of view, a moved and scanned position at which the peak of the interference fringes occurs is detected and a height at each position (at the Z-direction position) of the measurement surface of the work piece W is determined.

The computer system 2 is provided with a computer body 201, a keyboard 202, a joystick box (hereinafter referred to as a J/S 203, a mouse 204 and a display 205.

Figure 5:
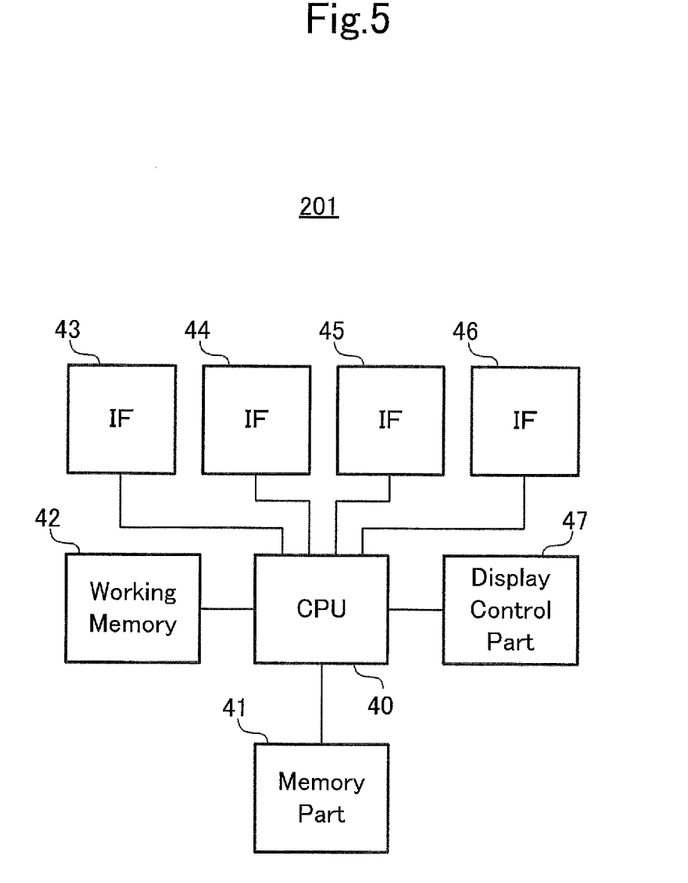
FIG. 5 is a block view showing the configuration of a computer body 201.

As shown in FIG. 5, the computer body 201 is provided with a CPU 40 which forms a core of control, a memory part 41, a working memory 42, interfaces 43, 44, 45, 46 and a display control part 47 that controls representation at a display 205.

An operator's instruction information input from the keyboard 202, the J/S 203 and a mouse 204 is input into the CPU 40 via the interface 43. The interface 44 is connected to the measuring device 1 in which the interference optical system and the image measuring device are combined, and supplies various control signals from the CPU 40 to the measuring device 1 in which the interference optical system and the image measuring device are combined. The interface 44 receives various kinds of status information and measurement results from the measuring device 1 in which the interference optical system and the image measuring device are combined, and inputs them into the CPU 40.

When an image measurement mode is selected, the display control part 47 displays, on the display 205, an image based on an image signal supplied from the CCD camera of the image optical head 151. When a light interference measurement mode is selected, the display control part 47 displays, in an appropriate manner, on the display 205, the image captured by the light interference optical head 152, CAD data, the three-dimensional shape data measured by the light interference optical head 152, or the like, based on the control by the CPU 40. The result of the measurement by the image optical head 151 or the light interference optical head 152 can be output to a printer via the interface 45. In addition, the interface 46 converts the CAD data (design data) of the work piece W provided by an exterior CAD system or the like, which is not shown, into a predetermined format, and inputs the same into the computer system 2.

The working memory 42 provides a working area for various processing by the CPU 40. The memory part 41 is configured by, for example, a hard disk drive, a RAM, or the like. The memory part 41 stores therein a program to be carried out by the CPU 40, and the result of measurement by means of the measuring device 1 in which the interference optical system and the image measuring device are combined, and the like.

The CPU 40 carries out various types of processing including: switching between the image measurement mode by means of the image optical head 151 and the light interference measurement mode by means of the light interference optical head 152; specifying the measurement range; moving of the imaging unit 15 in the X-axis direction; moving of the stage 12 in the Y-axis direction; adjusting the posture of the reference mirror 231; imaging of the two-dimensional images by means of the image optical head 151; measuring the interference image by means of the light interference optical head 152; and calculating the three-dimensional shape data or the like, based on the various types of information input via the corresponding interface, the instructions from the operator and the programs stored in the memory part 41 and the like. The CPU 40 achieves the function of the control part in the present invention by carrying out the programs stored in the memory part 41.

[Light Interference Optical Head Adjustment]

Figure 6:
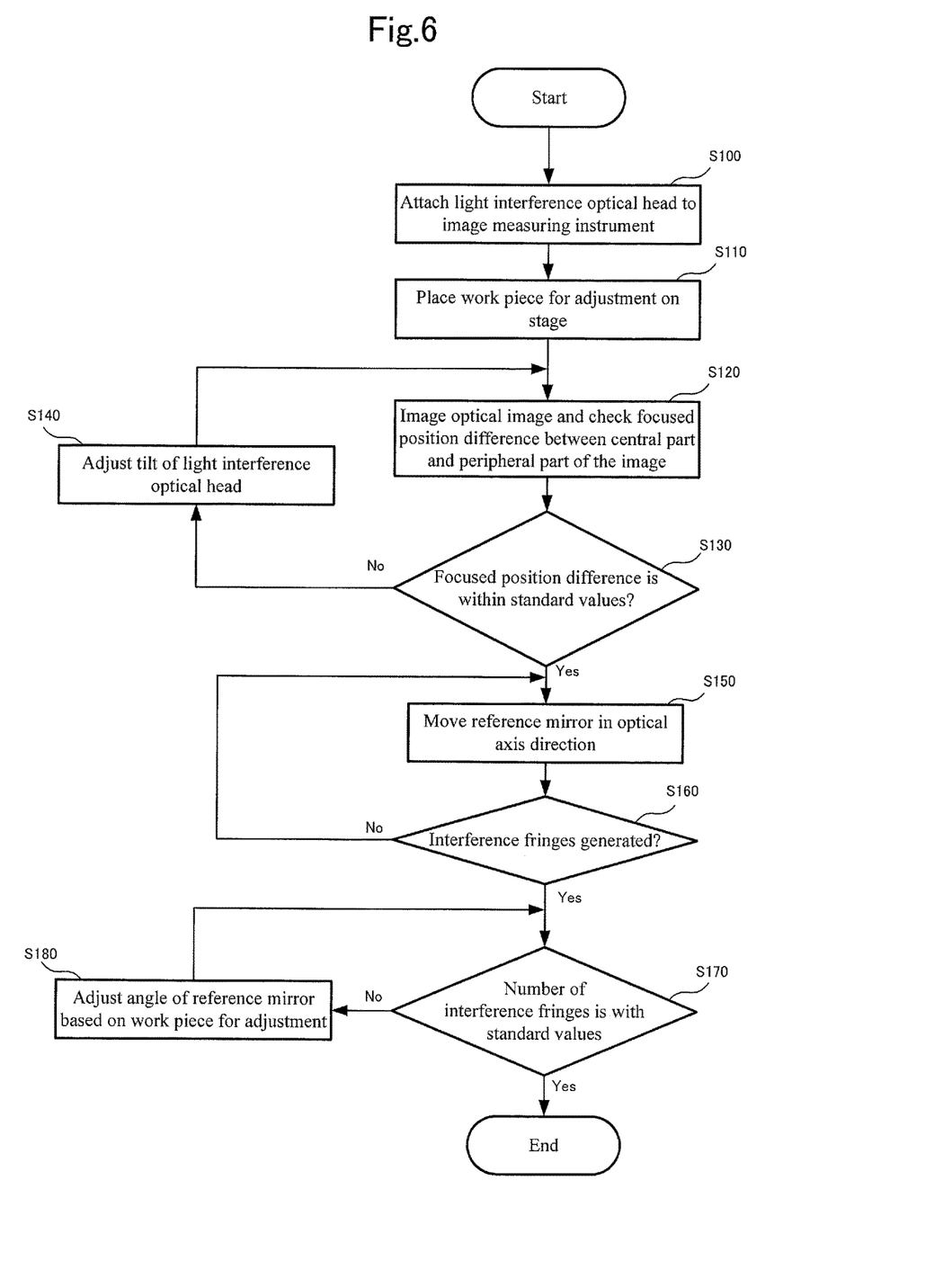
FIG. 6 is a flowchart illustrating the adjustment procedures which are performed when a light interference optical head 152 is attached to the body of an image measuring device.

FIG. 6 is a flowchart illustrating the adjustment procedures which are performed when the light interference optical head 152 is attached to the body of the image measuring device so as to perform three-dimensional shape measurement using the measuring device, in which the interference optical system and the image measuring device are combined, according to the present embodiment. This adjustment may also be carried out at an arbitrary timing, in addition to when the light interference optical head 152 is attached (for example, on a regular basis such as once a day). Hereinafter, the adjustment procedures will be described.

First, the light interference optical head 152 is attached to the imaging unit 15 of the measuring device 1 in which the interference optical system and the image measuring device are combined (step S100). Subsequently, a work piece W for adjustment is arranged on the stage 12 (step S110). It should be noted that the measurement surface of the work piece W for adjustment is planarized with sufficient precision, and a predetermined pattern is drawn on such measurement surface for checking a focused condition in an optical image. Subsequently, in the condition where the reference mirror 231 is retreated to a position at which the interference fringes will not occur, an optical image of the work piece W is imaged by the imaging part 25 while moving and scanning the position of the light interference optical head 152 in the optical axis direction, and the difference in focused position between the central part and the peripheral part of the obtained image is determined (step S120). The focused position can be detected as being a position where, for example, the highest contrast of a predetermined pattern is obtained.

When the difference in focused position does not lie within predetermined standard values (step S130; No), a tilt of the light interference optical head 152 is adjusted (step S140) and the processing is returned to step S120. On the other hand, when the difference in focused position lies within the predetermined standard values (step S130; Yes), the reference mirror 231 is moved in the optical axis direction so as to generate interference fringes (step S150). An interference image is then imaged by the imaging part 25 and a determination is made as to whether or not the interference fringes are present in the obtained image (step S160). When the interference fringes are not present in the obtained image (step S160; No), the processing is returned to step S150, and the piezo actuator 234 is driven in order to move the reference mirror 231 and the position of the reference mirror in the optical axis direction is re-adjusted. On the other hand, when the interference fringes are present in the obtained image (step S160; Yes), a determination is made as to whether or not the number of the interference fringes in the image is within the predetermined standard values (for example, one) (step S170). When the number of the interference fringes exceeds the predetermined standard values (step S170; No), the motor 238 and the motor 239 are driven in order to adjust the angle of the reference mirror 231 so that the number of the interference fringes is reduced (i.e. so that the measurement surface of the work piece W and the reflecting surface of the reference mirror 231 correspond to each other in a precise manner) (step S180), and then, the processing is returned to step S170. On the other hand, when the number of the interference fringes is within the predetermined standard values (step S170; Yes), the adjustment ends.

In the above adjustment, through steps S100 to S140, the posture of the light interference optical head 152 is adjusted such that the optical axis direction of the light interference optical head 152 is orthogonal to the measurement surface (reflecting surface) of the work piece W for adjustment. In addition, through steps S150 to S170, the posture of the reference mirror 231 is adjusted such that the tilt of the reflecting surface of the reference mirror 231 corresponds to the measurement surface (reflecting surface) of the work piece for adjustment. This adjustment is performed each time when the light interference optical head 152 is attached. Since the angle of the work piece W or the stage 12 remains unchanged in the above adjustment, the adjustment can be performed for causing interference fringes to be generated without affecting the coordinate system of the measuring device in which the interference optical system and the image measuring device is combined. For this reason, no cosine error occurs, even when the image optical head 151 is used after the adjustment. In addition, since a common coordinate system can be used in the measurement by means of the image optical head 151 and the measurement by means of the light interference optical head 152, the switching between two heads in a precise and rapid manner.

[Three-Dimensional Shape Measurement by Light Interference Optical Head]

Figure 7:
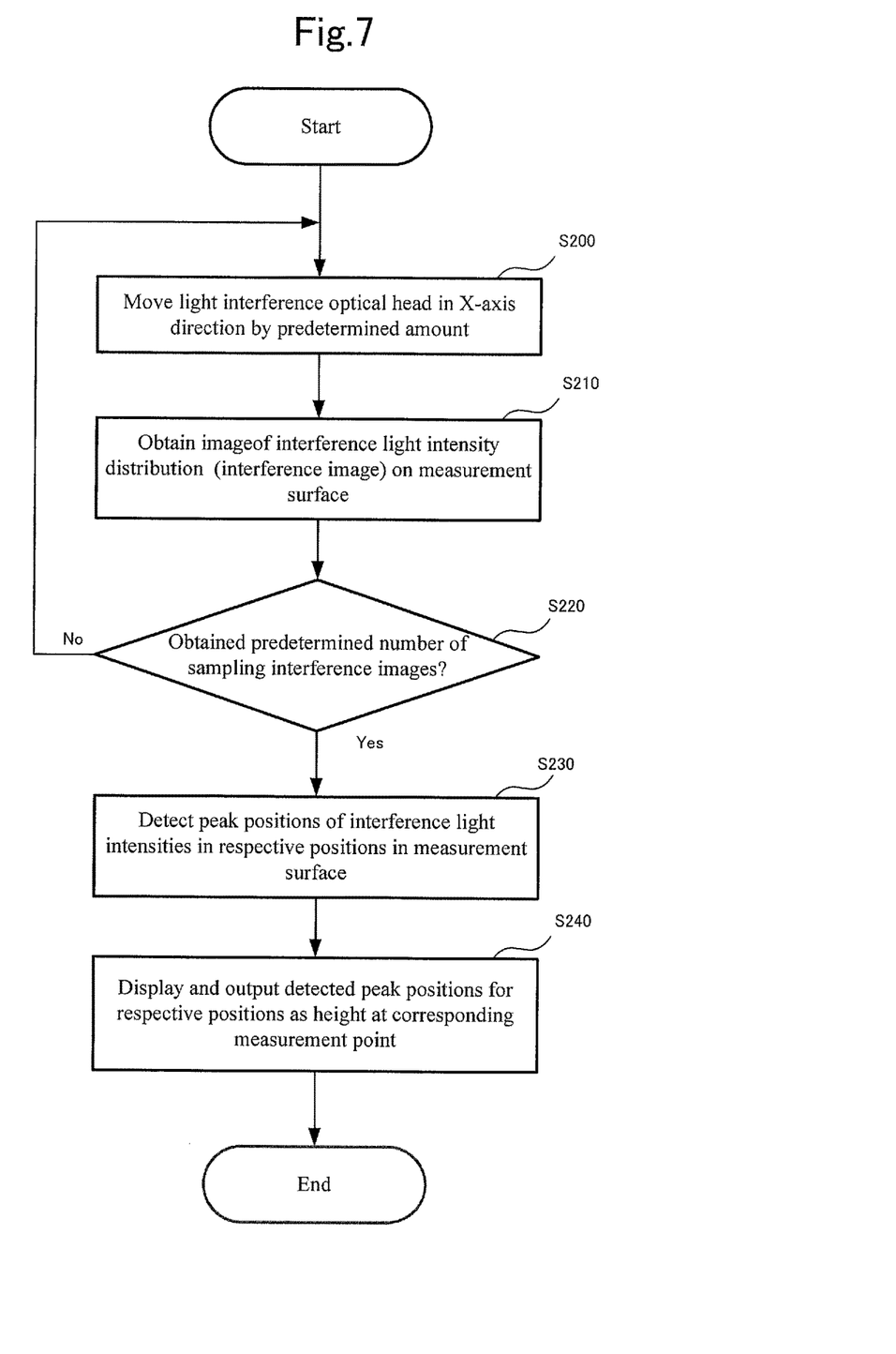
FIG. 7 is a flowchart illustrating the three-dimensional shape measurement procedures by means of a light interference optical head 152.

Next, with reference to the flowchart illustrated in FIG. 7, the three-dimensional shape measurement procedures by means of the light interference optical head 152 will be described. The measurement of a work for measurement is performed after replacing the work piece W for adjustment with a work piece W, which is a measuring object, in the condition where the above-described adjustment has been completed. When the three-dimensional shape measurement starts, the light interference optical head 152 is moved, by a predetermined amount, in the optical axis direction (i.e. the Z-axis direction) (S200), and then an interference image is imaged which indicates a two-dimensional distribution of the interference light intensities on the measurement surface (S210). This is repeated for a predetermined number of samplings (S200 to S220). When a predetermined number of interference images are accumulated, a peak position of the interference light brightness string is detected, wherein such string indicates changes in interference light intensities associated with a change in the optical path length difference at the respective measurement positions of the measurement surface (S230). The detected peak position of the corresponding measurement position is then displayed and output as a height at a measurement point (S240).

Variations to the Embodiments

It should be noted that the present invention is not limited to the above-described embodiments, and variations, modifications and the like within the scope capable of achieving the object of the present invention are encompassed in the present invention.

For example, in the above-described embodiments, as the light interference optical head, an example is explained in which a white-light light interference optical head that makes use of a light source that emits white light is used; however, instead of this, a monochromatic light interference optical head that makes use of a light source that emits monochromatic light, may be used as the light interference optical head. Alternatively, a light interference optical head that makes use of a light source that is capable of outputting white light and monochromatic light in a switching manner for the light source, may be employed, and thus the white-light interference measurement which has a wider measurement range and the monochromatic light interference measurement which is capable of ultraprecise measurement may be performed in a switching manner. As for a light source emitting monochromatic light, a laser having a desired wavelength may be used. When performing the monochromatic light interference measurement, three or more interference images may be imaged while varying the optical axis position of the reference mirror 231 or the wavelength of the light source, and, for each measurement point, a measurement value (i.e. a height of each measurement position) may be determined through operations based on the interference light intensities in such three or more images.

In addition, in the above-described embodiments, an example in which the image measuring device makes use of a Michelson interferometer is described; however, the present invention can also be applied to a measuring device that makes use of an interferometer other than the image measuring device. Further, the present invention can also be applied to a measuring device that makes use of a Mirau interferometer, a Fizeau interferometer, a Twyman-Green interferometer or any other equal optical path interferometer.

INDUSTRIAL APPLICABILITY

By being applied to a light interference measurement device, the present invention can perform adjustment for causing interference fringes to be generated without affecting the coordinate system of the light interference measuring device.

DESCRIPTION OF REFERENCE NUMERALS

1 . . . image measuring instrument
2 . . . computer system
3 . . . vibration isolation table
11 . . . mount
12 . . . stage
13a, 13b . . . support arms
14 . . . X-axis guide
15 . . . imaging unit
W . . . measuring object (work piece)

The invention claimed is:

1. A light interference measuring device comprising:
a light source that outputs light;
a beam splitter that causes the light output from the light source to diverge into a reference optical path and a measurement optical path and that outputs a combined wave in which reflection light that has passed through the reference optical path and reflection light that has passed through a measuring object arranged in the measurement optical path are combined;
a reference mirror that is arranged in the reference optical path and that reflects light which is diverged into the reference optical path by the beam splitter;
a stage that is arranged in the measurement optical path and that has the measuring object placed thereon;
an imaging part that is disposed at a position where the combined wave is converged and that images an image in which the combined wave is formed;
a reference mirror adjustment mechanism coupled directly or indirectly to the reference mirror that adjusts a posture of the reference mirror; and
a computer that controls the reference mirror adjustment mechanism such that a reflecting surface of the reference mirror corresponds to a measurement surface of the measuring object, based on an image imaged by the imaging part in a condition where a measuring object for adjustment is placed on the stage,
wherein the computer determines whether or not a number of interference fringes in the image is within a predetermined value;
when the number of the interference fringes exceeds the predetermined values, the computer controls the reference mirror adjustment mechanism to adjust the posture of the reference mirror such that the number of interference fringes is within the predetermined value;
the computer determines again whether or not the number of the interference fringes is within the predetermined value; and
the reference mirror adjustment mechanism comprises:
a first storage tube and a second storage tube, the first storage tube comprising two openings at both ends and a side wall extending between the two openings along an axis of the first storage tube, the second storage tube comprising an opening at one end, a bottom wall at other end opposite to the one end, and a side wall extending between the opening of the second storage tube and the bottom wall along an axis of the second storage tube, the axis of the first storage tube being parallel to the axis of the second storage tube, and the axis of the first storage tube and the axis of the second storage tube being parallel to an optical axis direction of the reference mirror;
a piezo actuator positioned between the first storage tube and the second storage tube so that the piezo actuator couples the first storage tube and the second storage tube, the piezo actuator driving, in a microscopic manner, the second storage tube in the optical axis direction;
a retention member in the second storage tube, the retention member retaining the reference mirror; and
a first motor that rotates the second storage tube and a second motor that rotates the retention member to adjust an angle of the reference mirror.

2. The light interference measuring device according to claim 1, wherein
the computer controls the piezo actuator so as to control a position in the optical axis direction of the reference mirror such that the interference fringes are present in the image imaged by the imaging part, and
the computer controls the first and second motors so as to adjust the angle of the reference mirror such that the number of the interference fringes present in the image imaged by the imaging part is within the predetermined value.

3. The light interference measuring device according to claim 1, wherein the light source, the beam splitter, the reference mirror, the imaging part and the reference mirror adjustment mechanism configure an interference optical system which is detachable from the light interference measuring device, and
prior to the adjustment of the posture of the reference mirror performed by the computer controlling the reference mirror adjustment mechanism, an angle relative to the measuring object is adjusted based on focused positions at a plurality of positions in an image of the measuring object imaged by the imaging part in a condition where the interference fringes are not generated.

4. The light interference measuring device according to claim 1, wherein the light source is configured to be capable of selectively outputting white light and monochromatic light in a switching manner.

5. A non-transitory computer-readable medium having a computer executable program to perform functions of the computer in the light interference measuring device according to claim 1.

6. The light interference measuring device according to claim 1, wherein the second motor rotates the retention member independently from the rotation of the second storage tube by the first motor.

7. The light interference measuring device according to claim 1, wherein the retention member swingably retains the reference mirror about a swinging axis; and
the first motor rotates the second storage tube about the optical axis and the second motor rotates the retention member around the swinging axis to adjust the angle of the reference mirror, the optical axis and the swinging axis being different from each other.

8. The light interference measuring device according to claim 1, wherein the retention member swingably retains the reference mirror about a swinging axis; and
the first motor rotates the second storage tube about the optical axis and the second motor rotates the retention member around the swinging axis to adjust the angle of the reference mirror, the optical axis being generally perpendicular to the swinging axis.

9. A light interference measuring device comprising:
a light source that outputs light;
an objective lens part comprising a beam splitter that causes the light output from the light source to diverge into a reference optical path and a measurement optical path and that outputs a combined wave in which reflection light that has passed through the reference optical path and reflection light that has passed through a measuring object arranged in the measurement optical path are combined;
a reference mirror that is arranged in the reference optical path and that reflects light which is diverged into the reference optical path by the beam splitter;
a stage that is arranged in the measurement optical path and that has the measuring object placed thereon;
an imaging device that images an image in which the combined wave is formed;
a reference mirror adjustment mechanism comprises:
a first storage tube and a second storage tube, the first storage tube being rotatably attached to the objective lens part and comprising two openings at both ends and a side wall extending between the two openings along an axis of the first storage tube, the second storage tube comprising an opening at one end, a bottom wall at other end opposite to the one end, and a side wall extending between the opening of the second storage tube and the bottom wall along an axis of the second storage tube, the axis of the first storage tube being parallel to the axis of the second storage tube, and the axis of the first storage tube and the axis of the second storage tube being parallel to an optical axis direction of the reference mirror;
a piezo actuator positioned between the first storage tube and the second storage tube so that the piezo actuator couples the first storage tube and the second storage tube, the piezo actuator driving, in a microscopic manner, the second storage tube in the ftfl optical axis direction;
a retention member in the second storage tube, the retention member retaining the reference mirror; and
a first motor that rotates the first and second storage tubes and a second motor that rotates the retention member to adjust an angle of the reference mirror; and
a computer that controls the piezo actuator and the first and second motors such that a reflecting surface of the reference mirror corresponds to a measurement surface of the measuring object, based on an image imaged by the imaging device in a condition where a measuring object for adjustment is placed on the stage,
wherein the computer determines whether or not a number of interference fringes in the image is within a predetermined value;
when the number of the interference fringes exceeds the predetermined values, the computer controls the piezo actuator and motor to adjust the posture of the reference mirror such that the number of interference fringes is within the predetermined value; and then
the computer determines again whether or not the number of the interference fringes is within the predetermined value.

10. The light interference measuring device according to claim 9, wherein the second motor rotates the retention member independently from the rotation of the second storage tube by the first motor.

11. The light interference measuring device according to claim 9, wherein the retention member swingably retains the reference mirror about a swinging axis; and
   the first motor rotates the second storage tube about the optical axis and the second motor rotates the retention member around the swinging axis to adjust the angle of the reference mirror, the optical axis and the swinging axis being different from each other.

12. The light interference measuring device according to claim 9, wherein the retention member swingably retains the reference mirror about a swinging axis; and
   the first motor rotates the second storage tube about the optical axis and the second motor rotates the retention member around the swinging axis to adjust the angle of the reference mirror, the optical axis being generally perpendicular to the swinging axis.

\* \* \* \* \*

UNITED STATES PATENT AND TRADEMARK OFFICE
CERTIFICATE OF CORRECTION

PATENT NO. : 9,726,473 B2
APPLICATION NO. : 14/570376
DATED : August 8, 2017
INVENTOR(S) : Kenji Okabe et al.

Page 1 of 1

It is certified that error appears in the above-identified patent and that said Letters Patent is hereby corrected as shown below:

In the Claims

In Column 12, Line 43 delete "ftfl"

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*